United States Patent Office 3,549,618
Patented Dec. 22, 1970

3,549,618
STARCH PROCESS
Edwin L. Speakman, Clinton, Iowa, assignor to Standard Brands Incorporated, New York, N.Y., a corporation of Delaware
No Drawing. Filed June 27, 1968, Ser. No. 740,466
Int. Cl. C08b 19/01
U.S. Cl. 260—233.3                                           6 Claims

ABSTRACT OF THE DISCLOSURE

Process for producing a formaldehyde-treated starch. After a formaldehyde-starch reaction has been terminated, a compound selected from the group consisting of sulfites, bisulfites and hydrosulfites is incorporated into the formaldehyde-treated starch. These compounds react with the unreacted or free formaldehyde present in the formaldehyde-treated starch and thus reduce the vaporization of the same.

---

This invention relates to an improved process for producing a formaldehyde-treated starch.

It is known in the art that the properties of starch may be altered by treating the same with formeldehyde. It is generally assumed that formaldehyde reacts with starch under acidic conditions to crosslink starch granules.

The prior art methods of treating starch with formaldehyde may be generally classified into two broad classes. The first, and perhaps the one of principal importance to the starch industry, is treating starch with formaldehyde under conditions such that the treated starch requires slightly more rigorous conditions for pasting than does the starch prior to the formaldehyde treatment. The uses of such treated starches vary widely. For instance, the treated starches may be used for sizing of paper, textiles and as adhesives. Typical processes for producing such formaldehyde-treated starches are disclosed, for example, in U.S. Patent 3,360,512, to Moore, U.S. Patent 2,113,034 to Rowland et al.

The other broad class of treating starch with formaldehyde includes preparing a formaldehyde-treated starch under such conditions as to obtain a starch product which is highly cross-linked. These highly cross-linked starch products tend not to disperse in water and maintain their granular characteristics even at high temperatures in the presence of relatively high concentrations of moisture. A typical process for preparing these products is disclosed in U.S. Patent 2,417,611 to Pierson. A specific use for such starch products is as a dusting powder, for instance as surgical dusting powder.

Although processes for preparing formaldehyde-treated starches vary depending upon the properties desired in the starch product, generally formaldehyde and starch are reacted in an aqueous slurry in the presence of a mineral acid catalyst. Usually, it is convenient to employ formaldehyde in the form of the polymer, paraformaldehyde, since it is a solid material and convenient to handle. In such a process, a water slurry containing the starch and paraformaldehyde is prepared and sufficient alkali added to disperse and dissolve the paraformaldehyde. The time required to accomplish this will depend upon a number of factors; for instance, the pH and temperature of the slurry and the degree of agitation employed. A pH in the range of 8.0 to 8.5 is preferred to dissolve the paraformaldehyde, although, of course, higher or lower alkaline pH's may be employed. If a water solution of formaldehyde is utilized, the pH of the slurry need not be so adjusted.

The amount of formaldehyde required is dependent upon a number of variables, such as the pH of the slurry, the length of time that the reaction is allowed to proceed, the temperature at which the reaction is carried out, the starch concentration of the slurry, and, of course, the properties desired in the product. When a granular starch product is desired, the reaction must be carried out below temperatures which will gelatinize the starch. Temperatures in the range of from about 118° to about 130° F. are suitable for this purpose. Higher temperatures may be employed when gelatinization inhibitors are present, such as NaCl and the like.

Preferably, the reaction is carried out in a starch slurry having a concentration of from about 16 to about 22° Baumé (24 percent to 39 percent starch on a dry solids basis). The pH during the reaction may be in the range from about 1.7 to about 2.5 and the paraformaldehyde concentration may be in the range of from about 0.25 to about 5 percent, based on the dry substance starch. The reaction time depends upon the viscosity characteristics desired, and may be in the range of from about 3 to 15 hours.

When the reaction has proceeded to the desired extent, sufficient alkali is added to terminate the reaction. This occurs at a pH of above about 3, for instance in the range from about 4 to about 8. The treated starch product can be separated from the slurry by conventional means. This may include sieving the slurry to remove non-starch materials and filtering, for instance on a vacuum drum filter. This starch product may then be dried at conventional starch drying temperatures, for example, at air temperatures from about 160° to 300° F. Depending upon the starch concentration of the slurry, it is sometimes advisable to dilute the slurry prior to the sieving thereof so as to effect an increased flow rate through the sieve. Because of the temperatures employed to effect reaction of the starch with formaldehyde, the starch slurry during this separation process may be at relatively high temperatures, for instance, above ambient temperature to about 130° F.

In commercial production of formaldehyde-treated starch, generally, there will be present after the reaction of formaldehyde and starch, unreacted or free formaldehyde. This formaldehyde is extremely undersirable because of its tendency to volatilize at low temperatures. This presents potential health hazards to those who are present in the vicinity of the separation process and to those who are present during the use of such a starch product. Even at extremely low concentrations, volatilized formaldehyde is irritating.

It is the principal object of the present invention to substantially eliminate free or unreacted formaldehyde from formaldehyde treated starch.

This object, and other objects of the present invention, which will be apparent from the disclosure below, are attained in accordance with the present invention by providing in formaldehyde-treated starch, containing unreacted or free formaldehyde, a sufficient amount of a compound selected from the group consisting of sulfites, bisulfites, hydrosulfites and mixtures thereof to substantially reduce vaporization of the unreacted or free formaldehyde present.

The term "starch" includes all raw starches, e.g., corn, tapioca, wheat, waxy sorghum, waxy maize, grain sorghum, rice and the like, and various modified starches and derivatives of starches, e.g., thin-boiling starches, oxidized starches, starch ethers, starch esters and the like, the only requirement being that the starch contain free hydroxyl groups.

The amount of sulfite, bisulfite, or hydrosulfite provided in the formaldehyde-treated starch, of course, is dependent upon the amount of unreacted or free formaldehyde present. Preferably, sufficient sulfite, bisulfite, or hydrosulfite is added to the formaldehyde-treated starch to substantially react stoichiometrically with the unreacted or free formaldehyde.

The sulfite, bisulfite, or hydrosulfite may be incorporated in the formaldehyde-treated starch in any convenient manner. They may be incorporated into the slurry after the formaldehyde-starch reaction has been terminated, into the formaldehyde-treated starch while it is being removed from the aqueous slurry and into the dried formaldehyde-treated starch product, so that when the user thereof disperses the treated starch, the sulfite, bisulfite, or hydrosulfite will react with the unreacted or free formaldehyde present. Preferably, however, the sulfite, bisulfite, or hydrosulfite is incorporated into the aqueous slurry of formaldehyde-treated starch after the reaction has been terminated. This provides the benefit that in the subsequent separation process, there is little or no formaldehyde vaporized. The preferred sulfite, bisulfite, or hydrosulfite are the salts of sodium and potassium, because of their ready availability and because of economic factors.

It is surprising that the above sulfite salts react with the unreacted or free formaldehyde present in formaldehyde-treated starch without detrimentally affecting the latter. Those skilled in the art would have assumed that an equilibrium exists between the free or unreacted formaldehyde and the formaldehyde bound to the starch, and that the removal of the free or unreacted formaldehyde would shift the equilibrium in such a manner so as to remove the bound formaldehyde from the starch. However, this does not occur. It was also surprising that the sulfite salts would react with the free or unreacted formaldehyde to produce such a stable compound that the formaldehyde-treated starch could be dried at normal starch air drying temperature, i.e. in the range of from about 160° to 300° F., without causing breakdown of the formaldehyde-sulfite reaction products.

In order to more clearly describe the nature of the present invention, specific examples will hereinafter be described. It should be understood, however, that this is done solely by way of example, and is intended neither to delineate the scope of the invention nor limit the ambit of the appended claims. In the examples and throughout this specification, percentages are intended to refer to percent by weight, unless otherwise specified.

In the following examples, fluidity of the modified starch and of the reaction product was measured according to the method disclosed in Cereal Chemistry, Vol. 36, pp. 108–127 (March 1959), entitled "The Estimation of Starch Paste Fluidities" by W. R. Fetzer and L. C. Kirst.

starch was heated to a temperature of 129° F., acidified with hydrochloric acid and maintained at this temperature until the starch was modified to a fluidity of about 185. A sufficient amount of a sodium carbonate solution was added to obtain a slurry pH of 8.5 One perecent paraformaldehyde based on the dry weight of the starch was added and the slurry stirred for about 2 hours to permit depolymerization of the paraformaldehyde. Sufficient hydrochloric acid was added to achieve a slurry pH of 2.25. After 6.5 hours the reaction product had a fluidity of 135. The pH of this slurry was then adjusted to 4 by the addition of a sodium carbonate solution. The slurry was diluted to a starch concentration of 28.43 percent and 3.25 percent sodium bisulfite based on dry basis starch added thereto. The slurry was sieved and the formaldehyde-treated starch was recovered on a rotary vacuum filter, washed on the filter and dried in a Procter & Schwartz drier at a maximum air temperature of about 280° F. to a moisture content of 10 to 13 percent. No formaldehyde odor was detected during the separation and the drying processes or during the use of the starch product.

Another formaldehyde-treated starch was prepared in the manner described above but without the addition of sodium bisulfite. In this case, the odor of unreacted or free formaldehyde was prevalent throughout the separation process and in the vicinity of the starch drier. Also, the user of this treated starch product detected relatively large quantities of unreacted or free formaldehyde when the starch product was pasted by heating in water.

EXAMPLE 2

This example illustrates the effect of various reagents on formaldehyde solutions under substantially the conditions present at the termination of the starch-formaldehyde reaction.

To formaldehyde solutions containing 0.5 and 1.0 percent by weight formaldehyde adjusted to a pH of 2 with HCl, were added sufficient amounts of reagents to achieve a molar ratio of reagent to formaldehyde of 1:1 and 2:1. In some cases, because of the alkalinity of the reagent the pH of the solution had to be adjusted downward after the addition of the reagent. This is shown in Table I below. These solutions were maintained at 120° F. and after time intervals of 1, 2, 3, 4, and 24 hours, the unreacted or free formaldehyde in the solutions was determined by the method appearing in Paper Trade Journal (Sept. 10, 1954) entitled "Rapid Identification of Wet-Strength Resins in Paper." The results of these experiments are shown in Table I below.

TABLE I.—RESULT OF FREE OR UNREACTED FORMALDEHYDE TEST

| Reagent | pH | Molar ratio | Time at 120° F. | | | | |
|---|---|---|---|---|---|---|---|
| | | | 1 hour | 2 hours | 3 hours | 4 hours | 24 hours |
| $NH_4Cl$ | 2.5 | 1:1 | Positive | Positive | Positive | Positive | Positive. |
| | 4.1 | 2:1 | do | do | do | do | Do. |
| $(NH_4)_2SO_4$ | 3.6 | 1:1 | do | do | do | do | Do. |
| | 4.0 | 2:1 | do | do | do | do | Do. |
| $NH_4NO_3$ | 2.7 | 1:1 | do | do | do | do | Do. |
| | 4.2 | 2:1 | do | do | do | do | Do. |
| $NH_4CO_3$ | [1]4.0 | 1:1 | do | do | do | do | Do. |
| | 4.0 | 2:1 | do | do | do | do | Do. |
| $NH_4OH$ | [2]4.0 | 1:1 | do | do | do | do | Do. |
| | 4.0 | 2:1 | do | do | do | do | Do. |
| Dimethylaminopropylamine | 4.0 | 2:1 | do | do | do | do | Do. |
| Diethylamine | 4.0 | 2:1 | do | do | do | do | Do. |
| $H_2O_2$ | 2.7 | 1:1 | do | do | do | do | Do. |
| NaClO | 4.0 | 1:1 | do | do | do | do | Do. |
| $Na_2S_2O_4$ | 6.0 | 1:1 | do | Trace | Negative | Negative | Negative. |
| | 6.7 | 2:1 | Trace | Negative | do | do | Do. |
| $NaHSO_3$ | 4.4 | 1:1 | Negative | do | do | do | Do. |

[1] Adjusted from pH of 8.6 to 4 because of the alkalinity of the reagent.
[2] Adjusted from pH of 10.0 to 4 because of the alkalinity of the reagent.

EXAMPLE 1

This example illustrates a typical method for producing a formaldehyde-treated starch and the subsequent treatment of such starch with sodium bisulfite.

A cornstarch slurry containing 35.5 percent dry basis

The results in Table I show that of the reagents used only the sulfites and hydrosulfites are effective to eliminate the free formaldehyde.

The terms and expressions which have been employed are used as terms of description and not of limitation,

What is claimed is:

1. A process for producing a formaldehyde-treated starch comprising reacting starch and formaldehyde under conditions whereby unreacted or free formaldehyde is present in the formaldehyde treated starch and incorporating into the formaldehyde-treated starch a sufficient amount of a compound selected from the group consisting of sulfites, bisulfites, hydrosulfites and mixtures thereof to substantially reduce vaporization of the unreacted or free formaldehyde present.

2. A process for producing a formaldehyde-treated starch as defined in claim 1, wherein the starch and formaldehyde are reacted in an aqueous slurry and after termination of the reaction a sufficient amount of a compound selected from the group consisting of sulfites, bisulfites, hydrosulfites and mixtures thereof is incorporated into the slurry to substantitally reduce vaporization of the unreacted or free formaldehyde present.

3. A process for producing a formaldehyde-treated starch as defined in claim 2, wherein the starch and formaldehyde are reacted in an aqueous slurry at a pH in the range of from about 1.7 to about 2.5 and the reaction is terminated by adjusting the pH of the slurry to above about 3.

4. A process for producing a formaldehyde-treated starch as defined in claim 3, wherein the reaction is carried out at a temperature below the gelatinization temperature of the starch.

5. A process for producing a formaldehyde-treated starch as defined in claim 4, wherein a sufficient amount of a compound selected from the group consisting of sulfites, bisulfites, hydrosulfites and mixtures thereof is provided in the aqueous slurry to substantially react stoichiometrically with the unreacted or free formaldehyde.

6. A process for producing a formaldehyde-treated starch as defined in claim 5, wherein the compound selected from the group consisting of sulfites, bisulfites, hydrosulfites and mixtures thereof, is the sodium or potassium salt thereof.

References Cited

UNITED STATES PATENTS

| 2,113,034 | 4/1938 | Rowland et al. | 92—21 |
| 2,417,611 | 3/1947 | Pierson | 260—209 |
| 2,880,236 | 3/1959 | Mehltretter et al. | 260—513 |
| 3,231,560 | 1/1966 | Keen | 260—209 |
| 3,329,672 | 7/1967 | Roberts | 260—233.3 |
| 3,360,512 | 12/1967 | Moore | 260—233.3 |

DONALD E. CZAJA, Primary Examiner

M. I. MARQUIS, Assistant Examiner

U.S. Cl. X.R.

117—139.5; 127—67; 260—233.5

UNITED STATES PATENT OFFICE
CERTIFICATE OF CORRECTION

Patent No. 3,549,618                    Dated December 22, 1970

Inventor(s) Edwin L. Speakman

It is certified that error appears in the above-identified patent and that said Letters Patent are hereby corrected as shown below:

The Serial Number of the application listed as "740,46 should read --740,464--. In column 1, line 26, the word "formeldehyde" should read --formaldehyde--. In column 4, 5, the term "perecent" should read --percent--; in line 17, "Procter" should read --Proctor--. In Table I, under the h ing "Reagent", "$NH_3OH$" should read --$NH_4OH$--.

Signed and sealed this 15th day of June 1971.

(SEAL)
Attest:

EDWARD M. FLETCHER, JR.
Attesting Officer

WILLIAM E. SCHUYLER
Commissioner of Pat